UNITED STATES PATENT OFFICE.

ALFRED M. BAILEY, OF SALEM, MASSACHUSETTS.

COMPOUND.

1,029,165.     Specification of Letters Patent.     Patented June 11, 1912.

No Drawing.     Application filed April 11, 1911. Serial No. 620,443.

*To all whom it may concern:*

Be it known that I, ALFRED M. BAILEY, citizen of the United States, residing at Salem, in the county of Essex and State of Massachusetts, have invented certain new and useful Improvements in Compounds, of which the following is a specification.

The present invention aims to disclose a novel leather dressing compound for use primarily in dressing the heels, bottoms and edges of shoe soles, the compound consisting of such ingredients as will impart a high polish to the parts treated and will render them water proof as far as concerns the surfaces upon which the compound is applied.

It is also an aim of the invention to disclose a compound including a number of waxes having different melting points and other unlike physical properties so that the product will not be liable to become too soft for use in warm weather nor too hard for use in cold weather.

The compound consists of a mixture of carnauba wax, paraffin wax, Cera wax, beeswax, Venice turpentine, and gum camphor. These several ingredients are mixed by cutting the waxes into small pieces and also the gum camphor and melting them after having added the Venice turpentine. As the ingredients are being melted, they are stirred so as to become thoroughly mixed and after having been properly mixed, the mixture while hot, is poured into suitable molds and allowed to cool. The molds may, of course, be so formed as to cast the mixture in any desired shape convenient for use, as for example in the form of a stick.

The waxes having different physical properties and different melting points, softening of the mixture in warm weather and its hardening in cold weather, to such a degree as to render it unfit for use, is obviated.

The Venice turpentine renders the coating more permanent than if the wax and camphor were applied alone, and the camphor assists the waxes in imparting a high polish to the surface treated.

Having thus described the invention what is claimed as new is:—

A leather dressing compound consisting of a mixture of carnauba wax, paraffin wax, Cera wax, beeswax, Venice turpentine and gum camphor in about the proportions of six ounces of carnauba wax, six ounces of paraffin wax, one ounce of Cera wax, one-half ounce of beeswax, one-half ounce of Venice turpentine and two ounces of gum camphor.

In testimony whereof, I affix my signature in presence of two witnesses.

ALFRED M. BAILEY. [L. S.]

Witnesses:
    THOMAS O. JENKINS,
    JAMES H. FALLON.